United States Patent [19]

Schaaf

[11] 4,028,074

[45] June 7, 1977

[54] VACUUM CLEANER FILTER BAG

[75] Inventor: Robert Schaaf, Brooklyn, N.Y.

[73] Assignee: Air Filters, Inc., Brooklyn, N.Y.

[22] Filed: Oct. 14, 1975

[21] Appl. No.: 621,828

[52] U.S. Cl. .................. 55/366; 55/371; 55/374; 55/378; 55/381; 55/DIG. 2

[51] Int. Cl.² ........................ B01D 46/02

[58] Field of Search ........... 55/366, 369, 370, 374, 55/375, 381, 371, 364, 395, 429, DIG. 2

[56] References Cited

UNITED STATES PATENTS

| | | | |
|---|---|---|---|
| 1,827,496 | 10/1931 | Vanderwilt | 55/366 |
| 1,829,255 | 10/1931 | Ballou | 55/374 X |
| 1,970,043 | 8/1934 | Kern | 55/370 X |
| 2,007,518 | 7/1935 | Calhoun | 55/366 |
| 2,039,741 | 5/1936 | Richards | 55/366 |
| 2,174,730 | 10/1939 | White | 55/366 |
| 2,610,702 | 9/1952 | Thornwald | 55/375 X |
| 2,714,426 | 8/1955 | White | 55/366 X |
| 2,780,828 | 2/1957 | Brace | 55/374 X |
| 2,784,800 | 3/1957 | Segesman | 55/375 X |
| 3,188,681 | 6/1965 | Jepson et al. | 55/375 X |
| 3,297,233 | 1/1967 | Meyerhoefer | 55/381 X |
| 3,330,099 | 7/1967 | Fesco | 55/374 X |
| 3,350,859 | 11/1967 | Fesco | 55/381 X |
| 3,619,989 | 11/1971 | Howard et al. | 55/381 X |
| 3,728,847 | 4/1973 | Howard et al. | 55/DIG. 2 X |

Primary Examiner—Frank W. Lutter
Assistant Examiner—Kathleen J. Prunner
Attorney, Agent, or Firm—Friedman, Goodman & Teitelbaum

[57] ABSTRACT

A vacuum cleaner filter bag for an upright vacuum cleaner comprising an air pervious filter receptacle and an air impervious feed tube interconnected together so that the interior of the filter receptacle is in air-flowing relationship with the interior of the feed tube, where the feed tube is adapted to be connected to the vacuum cleaner. A collar is intermediately disposed within the filter receptacle and secured therein by a clamping ring disposed externally of the filter receptacle in juxtaposition with an upper portion of the collar. An air impervious dust receptacle is removably disposed within a lower portion of the filter receptacle with a mouth portion of the dust receptacle being disposed about a lower end of the collar. A resiliently expandable ring releasably secures the dust receptacle mouth portion about the collar so that the dust receptacle is maintained in an open mouth suspended condition within the filter receptacle to receive and collect debris introduced into the filter receptacle. A sealable opening is provided in the filter receptacle to permit insertion and removal of the dust receptacle from the filter receptacle.

6 Claims, 6 Drawing Figures

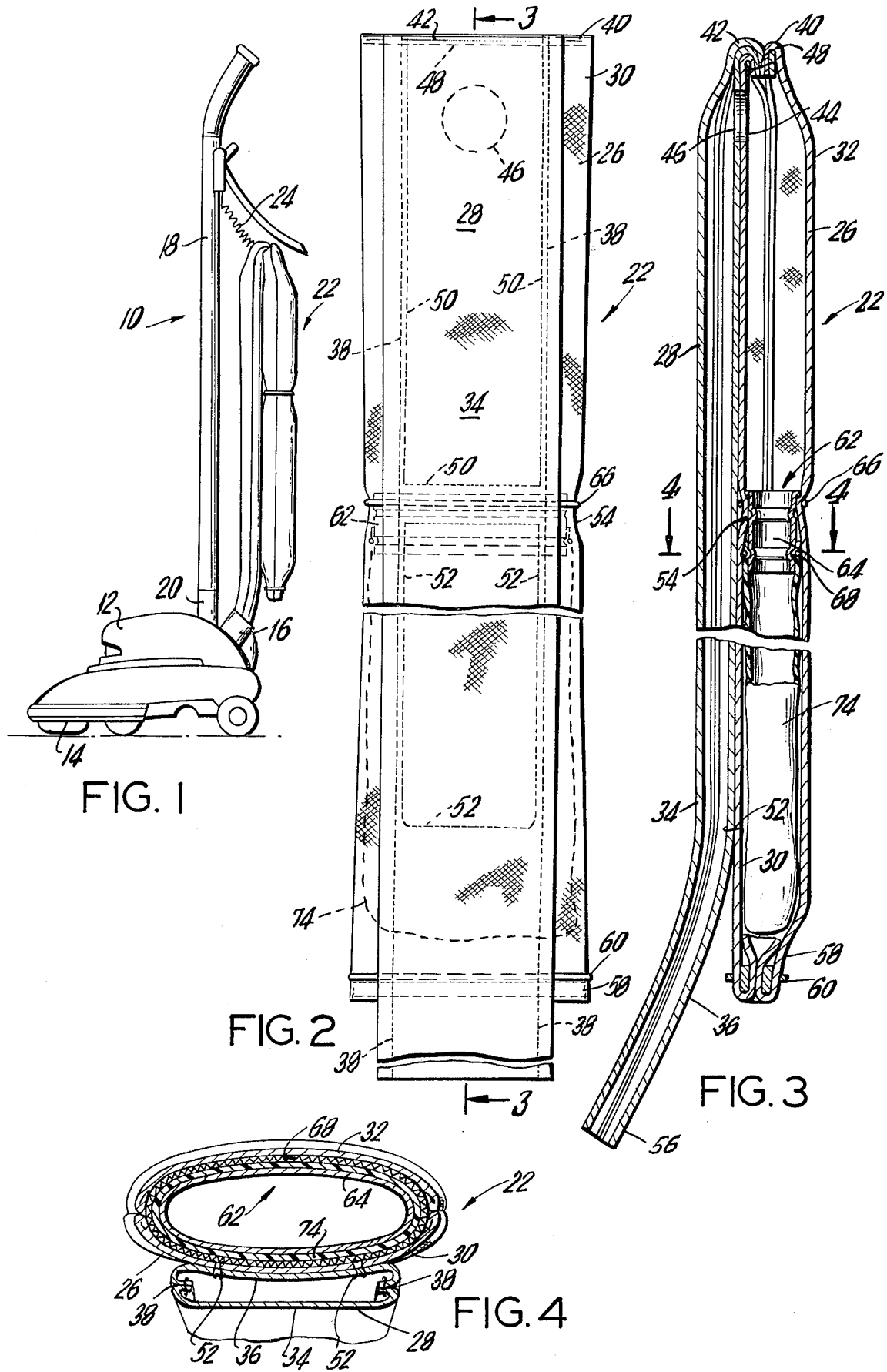

VACUUM CLEANER FILTER BAG

BACKGROUND OF THE INVENTION

This invention relates to a filter bag, and more particularly to a vacuum cleaner filter bag having a removable air impervious dust receptacle.

Upright vacuum cleaners conventionally employ debris collecting bags formed of an air previous or filter material. In such cleaners, an elongated generally tubular bag is disposed in vertical axial alignment with the operating handle of the cleaner. Means are provided for coupling the bag to the cleaner, whereby a debris entrained air stream is introduced into the bag so that separation of the debris from the air stream is accomplished. Means are further provided for removal of the collected debris within the bag at suitable intervals.

In the type filter bag to which this invention is particularly directed, a feed tub running parallel with the bag body is employed. The lower end of such feed tube is provided with suitable coupling means to permit it to be attached to an outlet port of a motor operated suction fan of the cleaner. The upper end of the tube is attached to the corresponding upper end of the bag and provision is made for passage of the air stream from the tube into the upper end of the filter bag. The debris is picked up by the inlet nozzle of the suction fan and carried by the air stream produced thereby to the upper end of the bag by means of the feed tube, whence it is introduced into the filter bag snd the separated debris ultimately falls into and is collected at the bottom of the bag. Removal of the debris is accomplished by means of a sealable access opening located at the bottom of the bag. A bag of this general type is shown and described in the patent to S. Howard, et al., entitled "Vaccum Cleaner Bag", U.S. Pat. No. 3,619,989, issued Nov. 16, 1971.

In bags of this type, in order to permit the internal pressure in the bag to be relieved and to provide for a continuous air stream, it has been necessary to utilize relatively expensive air pervious filtering materials in order to accomplish the necessary separation of the debris from the air stream in which it is entrained. Customarily, such bags are formed of fabric or textile materials permitting the reuse of the bag. Alternatively, the bag may be formed of paper having the necessary filtration characteristics. The latter form of paper filtration bag is disposable. In either event, the bag material represents considerable expense and in many instances is inconvenient to manipulate and empty for reuse.

SUMMARY OF THE INVENTION

Accordingly, it is an object of the present invention to provide a vacuum cleaner filter bag which overcomes the disadvantages of the prior art.

It is another object of this invention to provide a vacuum cleaner filter bag assembly wherein a reusable filter bag is employed in combination with an internally disposed dirt receiving receptacle, such receptacle being formed of an inexpensive air impervious or non-filtering material to permit convenient, economical and sanitary disposal of the collected debris.

It is a further object of this invention to provide a vacuum cleaner filter bag wherein the amount of relatively expensive air filtration material required is substantially reduced, resulting in economies with regard to the original installation or replacement thereof.

A further objective of this invention is to provide efficient and effective means for separating a vacuum cleaner bag into discreet compartments for debris separation and reception, storage and removal, respectively.

It is also an object of this invention to provide an effective, efficient and economical mounting assembly, permitting an inexpensive dirt receiving receptacle to be disengagably mounted within a vacuum cleaner bag of the type indicated, so as to permit a disposable and inexpensive dirt receiving receptacle to be readily mounted therein, removed therefrom, and replaced with a similar debris receiving receptacle.

To this end, the present invention relates to a vacuum cleaner filter bag for an upright vacuum cleaner comprising an elongated air pervious filter receptacle having an upper end provided with an inlet port, an air impervious feed tube disposed externally of the filter receptacle, the feed tube having an inlet end for releaseable connection to an outlet port of the vacuum cleaner's suction blower and an outlet end secured to and in communication with the inlet port of the filter receptacle, the filter receptacle including opening means to provide access to the lower interior thereof. A collar of relatively rigid material is disposed within the filter receptacle intermediate the upper end and lower end thereof, the collar being configurated to conform to the interior of the filter receptacle when in operating condition. Clamping means are disposed externally of the filter receptacle in juxtaposition with an upper portion of the collar for securing the upper portion of the collar in position by clamping engagement through the wall of the filter receptacle. A dust or debris receptacle is removably disposed within the filter receptacle, the dust receptacle comprising an open mouth bag-like enclosure fabricated from an air impervious material and having its mouth portion disposed about a lower end of the collar. Resiliently expandable ring means releasably secure the dust receptacle mouth portion about the collar, whereby the dust receptacle is maintained in an open mouth suspended condition within the filter receptacle to receive and collect debris introduced into the filter receptacle. The opening means are dimensioned to permit insertion and removal of the dust receptacle from the filter receptacle. Releasable sealing means seal the opening means when the receptacle is in the operating condition.

BRIEF DESCRIPTION OF THE DRAWINGS

With the above the additional objects and advantages in view, as will hereinafter appear, this invention comprises the devices, combinations and arrangements of parts hereinafter described by way of example and illustrated in the accompanying drawings of a preferred embodiment in which:

FIG. 1 illustrates a side elevational view of an upright vacuum cleaner embodying a filter bag assembly in accordance with the present invention;

FIG. 2 illustrates a fragmented front elevational view of a vacuum cleaner assembly in accordance with the present invention;

FIG. 3 illustrates a sectional view in fragmented form taken along line 3—3 of FIG. 2;

FIG. 4 illustrates a sectional view of the vacuum cleaner filter bag assembly taken along line 4—4 of FIG. 3;

DESCRIPTION OF THE PREFERRED EMBODIMENT

Figure 5:
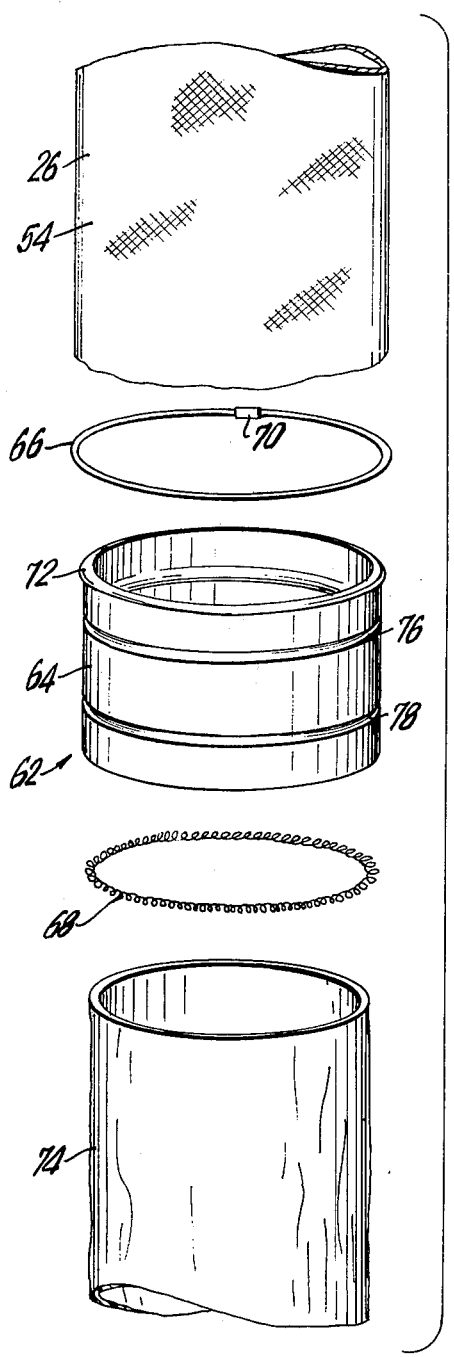
FIG. 5 illustrates an exploded perspective view of the collar arrangement showing the bag body in fragmented form.

Turning now in detail to the appended drawings, FIG. 1 illustrates a conventional upright cleaner generally indicated by the reference number 10.

The cleaner 10 comprises a wheel mounted housing 12 which includes an inlet nozzle 14 facing the surface to be cleaned. Housing 12 has disposed therein the usual motor operated suction fan (not shown). The housing 12 is provided with a rearwardly extending tubular fitting or outlet port 16 to which the lower end of a fitting tube of a vacuum cleaner bag is secured by conventional connecting means. An operating handle 18 extending in a generally vertical direction is suitably connected to the housing 12 as by a pivotable joint 20 permitting the cleaner 10 to be propelled as desired. The vacuum cleaner filter bag assembly of the present invention, which is designated generally by the numeral 22, is secured to the handle 18 by a linkage 24.

FIGS. 2, 3, and 4 illustrate the construction of the bag assembly 22 in accordance with the present invention. The bag assembly 22 comprises a filter bag or receptacle member 26 and a feed tube member 28 externally mounted thereon in alignment therewith. The filter bag 26 is fabricated from an air permeable materials preferably a textile or fabric. The filter bag 26 has a front panel or side wall 30 and a rear panel or side wall 32 which are connected by conventional securing means, such as by stitching, along their longitudinal edges to define an interior compartment therebetween. However, it is understood, that the filter bag 26 can be formed from a tubular material if desired. Accordingly the feed tube member 28 is also formed from a front panel 34 and a rear panel 36, being secured together along their longitudinal edges by conventional means, such as by stitching 38 to define an interior compartment therebetween. The feed tube member 28 is preferably formed from an air impervious material, but such material is not necessary for the function of the bag, as long as a sufficient amount of air flows through the feed tube member 28 to the filter receptacle 26, as will be discussed hereinafter below.

The filter bag 26 and feed tube member 28 are interconnected, each having an upper end 40, 42, respectively, in common air tight securement with the other and each having one longitudinal panel 30, 36, respectively in common opposing securement, so that generally circular apertures 44, 46 provided in the respective panels 30, 36, are in alignment with each other as best shown in FIG. 3. The ends 40, 42 may be commonly secured by tucking end 42 of the feed tube member 28 inside the inwardly folded over ends 40 of the filter bag 26, and stitching the whole together as at 48. The panel members 30, 36 are secured together by conventional means such as by stitching 50 on the upper portions thereof and stitching 52 on the lower portions thereof, so that the medial portion 54 of the filter bag 26 is free of the feed tube member 28, to provide a space for insertion therebetween of an external clamping member as will be discussed hereinafter below.

The feed tube member 28 extends downwardly and has an end portion 56 for connection to the outlet port 16 of the vacuum cleaner housing 12. The lower end 58 of the filter bag 26 is adapted to be openable and air tightly closable by means of a suitable clamp 60, such as a pinch clamp, which is tensionally fitted into the inwardly folded over extreme ends thereof.

Thus, in the above showing, when the access end 56 of the feed tube member 28 is suitably connected to the air-discharging port 16 or an operative upright vacuum cleaner 10, dirt ladened air passes through the vacuum cleaner into the feed tube member 28 and is directed upwardly therethrough, then passes through the registered apertures 46, 44, and finally downwardly into the internal compartment of the filter receptacle 26. Reference may be made to the above-mentioned U.S. Pat. No. 3,619,989, which functions in a similar manner up to this point.

Additionally, the filter receptacle 26 may be flared outwardly from the medial portion 54 towards the ends 40, 58, as best shown in FIG. 2, so that the debris passing through the opening 44 is funneled downwardly towards the collar at the medial portion 54. The wide end portion 58 allows for a larger opening therein to permit easier access into the interior of the filter receptacle 26 and to the collar therein, the purpose of which will be indicated hereinafter below.

A receptacle mounting insert collar assembly 62 is secured within the filter receptacle 26 at the medial portion 54 thereof, being generally radially of the length thereof. As best shown in FIG. 5, the collar assembly 62 includes a collar member 64, a clamping member 66 and a resiliently expandable ring member 68. The collar member 64 is of rigid construction, and may advantageously be fabricated from sheet metal or plastic material. The configuration of the collar member is generally cylindrical. The term cylindrical as herein employed, is intended to denote the general cross sectional configuration of the filter bag wall when in distended condition, and may be circular or oval in cross section transversely of the longitudinal axis of the filter bag 26.

It is intended that the collar member 64 fit into the interior of the distended bag with sufficient snugness so that when the clamping member 66 is applied about the exterior of the filter bag wall, an air tight seal is formed between the peripheral surface of the collar member 64 and the interior surface of the medial portion 54 of the filter receptacle 26. The clamping member 66 may be a wire or band of conventional construction, such as a flexible metal band which is tightened and held by conventional binding means 70. In order to more efficiently secure the collar member 64 to the bag wall, and to maintain the collar member 64 in a suspended condition downwardly therefrom within the interior of the filter bag 26, an outwardly directed peripheral flange or lip 72 is provided at an upper portion thereof.

It is noted, particularly in FIG. 3, that the feed tube 28 is free of attachment to the filter bag panel 30 at the medial portion 54 thereof, so that the clamping member 66 is permitted to pass through the space between the filter bag panel 30 and feed tube panel 36 in order that the air flow through the feed tube 28 is not impeded. It is also noted, that the lower end of the collar member 64 is free of attachment to the filter receptacle 26, so as to permit the disengageable attachment of a debris or dust receptacle 74 thereto, as will more particularly be described hereinafter below.

The disposable debris or dust receiving receptacle 74 is a simple opened mouth bag of conventional configuration such as used for the reception, packaging or storage of food or merchandise. It is formed of an inexpensive air impervious material, such as paper, plastic and the like which consequently is disposable, such as for example, being formed from a thin, flexible polyethylene film.

As has heretofore been indicated, the open mouth debris receptacle 74 is intended to be disengageably attached to a lower end of the collar member 64. For this purpose, a pair of axially spaced apart circumferential grooves 76 and 78 are provided in the external peripheral surface of the collar member 64, being spaced below the lip 72 thereof. These grooves 76, 78 are adapted to receive and removably retain the resilient ring member 68. Preferably, the resilient ring member 68 is a garter spring ring which is essentially a helically wound spring with the ends thereof secured to each other to form a continuous toroid. Only one such spring ring 68 is utilized to be selectively positioned in either one of the grooves 76, 78. The lower groove 78 is intended to be utilized for receiving the ring to secure the debris receptacle 74 in position, while the upper groove 76 is to be utilized for retaining the ring 68 while in the process of removing and replacing the debris receptacle 74.

The open mouth of the debris receptacle 74 is dimensioned so as to be received on the lower free end of the collar member 64, with the mouth portion of the debris receptacle 74 covering the lower peripheral groove 78 as shown in FIG. 3. When positioning the debris receptacle 74, the ring member 68 is initially disposed out of the way within the upper peripheral groove 76. The mouth portion of the debris receptacle 74 should preferably be significantly snug when positioned on the collar 64 so that when the spring ring 68 is rolled or lowered thereover, a sufficiently air tight seal is formed between the receptacle mouth and the collar wall. In rolling the spring ring 68 down from the groove 76 and over the bag mouth, the spring ring 68 passes into the lower groove 78 to resiliently press the receptacle mouth against the collar wall within the groove 78 to thus form an efficient seal. Thus, the spring ring 68 secures the dust receptacle 74 in a suspended position from the collar member 64 within the lower half interior of the filter receptacle 26.

Insertion and removal of the debris receptacle 74 into and out of the lower interior chamber of the filter receptacle 26 is accomplished through the resealable opening in the lower end 58 of the filter receptacle 26, mentioned above. It is noted, that the tapering of the lower half of the filter receptacle 26 permits the lower end 58 to be easily gathered up towards the narrower medial portion 54, so that the debris receptacle 74 can more conveniently be inserted and removed from the collar member 64.

Figure 6:
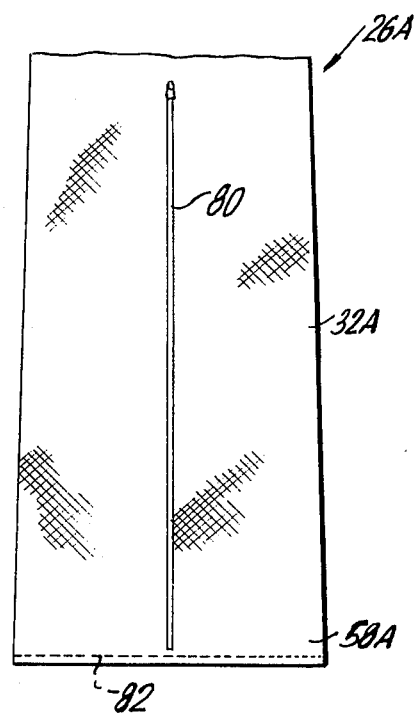
FIG. 6 illustrates a fragmentary rear elevational view of a bottom portion of a vacuum cleaner filter bag assembly in accordance with the present invention showing a different type of sealing closure.

FIG. 6 shows a lower half of a rear panel 32A of a modified filter receptacle 26A. In this modified form, a resealable opening is provided longitudinally along the lower half of the rear panel 32A. Closure of the opening is accomplished in a conventional manner, such as by a zipper 80 to provide an air tight closure. Furthermore, the lower end 58A of the filter receptacle 26A is permanently closed by conventional means, such as by stitching 82. Accordingly, the debris receptacle 74 can easily be inserted and removed through the zipper closure 80 for attachment to and removal from the collar member 64, in the same manner as mentioned above.

In the above indicated arrangement, once the debris ladened air stream passes upwardly into the feed tube member 28 and through the registered openings 46, 44 into the upper portion of the filter receptacle 26, the debris is separated from the air stream in which it was entrained, and drops downwardly so as to be funneled to and through the collar member 64 into the debris receptacle 74. The air stream is filtered through the air permeable walls of the filter receptacle 26, where the debris remains within the filter receptacle 26 for passage into the debris receptacle 74. When the debris receptacle 74 has been sufficiently filled, access thereto is had through either opening provided in the filter receptacle, as above indicated.

To remove the debris receptacle 74, the spring ring 68 is slipped upwardly along the collar member 64 until it rests in the upper groove 76 thereof, and the debris receptacle 74 may now be withdrawn and removed without the user coming into contact with the debris. As indicated above, the spring ring 68 remains on the collar in the upper groove 76 in preparation for the insertion of a replacement debris receptacle. A replacement debris receptacle may then be mounted on the collar member 64 in the manner indicated above.

It is significant, that the lower half of the filter receptacle 26 need not be necessarily formed of an air pervious or filter material, as long as the upper half of the filter receptacle 26 is formed from an air pervious or filter material. Consequently, by forming the lower half of the filter receptacle 26 with a less expensive air impervious material, a material saving in cost may be accomplished.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A vacuum cleaner filter bag for an upright vacuum cleaner comprising an elongated air pervious filter receptacle having an upper end provided with an inlet port, an air impervious feed tube disposed externally of said filter receptacle in a side-by-side arrangement, said feed tube having a lower inlet end for releasable connection to an outlet port of the vacuum cleaner and an upper outlet end secured in a face-to-face relationship to and in communication with said inlet port of said filter receptacle, said filter receptacle including opening means to provide access to a lower interior thereof, a collar of relatively rigid material disposed within said filter receptacle intermediate said upper end and a lower end thereof, said collar being configurated to conform to the interior of said filter receptacle when in operating condition, clamping means disposed externally of said filter receptacle in juxtaposition with an upper portion of said collar for securing and supporting said upper portion of said collar in position by a clamping engagement against side walls of said filter receptacle, said clamping means being disposed between said filter receptacle and said feed tube, said feed tube being connected to said filter receptacle above and below said clamping means to provide a space for receiving said clamping means, a dust receptacle removably disposed within said lower interior of said filter receptacle, said dust receptacle including an open mouth bag-like enclosure fabricated from an air impervious material and having its mouth portion disposed about a lower end of said collar, resiliently expandable ring means for releasably securing said dust receptacle mouth portion about said collar to maintain said dust receptacle in an open mouth suspended condition within said lower interior of said filter receptacle to receive and collect debris introduced into said filter receptacle, said collar being provided with a pair of axially spaced apart circumferential grooves in an external peripheral surface thereof to receive and removably retain said ring means, a lower one of said grooves being utilized for receiving said ring means to secure said dust receptacle in position against said collar, an upper one of said grooves being utilized for retaining the ring means while said dust receptacle is being removed and replaced, said opening means being dimensioned to permit insertion and removal of said dust receptacle from said filter receptacle, said filter receptacle being flared outwardly from its medial portion towards said upper and lower ends to funnel the debris downwardly towards said collar and to permit easier access to said collar through said opening means, and releasable sealing means for sealing said opening means when said filter receptacle is in said operating condition.

2. A vacuum cleaner filter bag as claimed in claim 1, wherein said ring means is a helical spring ring.

3. A vacuum cleaner bag as claimed in claim 1, wherein an upper portion of said collar is provided with an outwardly directed peripheral lip for association with said clamping means to maintain said collar in a suspended condition.

4. A vacuum cleaner bag as claimed in claim 3, wherein said clamping means is a flexible metal band disposed externally around said side walls of said filter receptacle.

5. A vacuum cleaner bag, as claimed in claim 1, wherein said opening means is at said lower end of said filter receptacle.

6. A vacuum cleaner bag as claimed in claim 1, wherein said opening means is longitudinally disposed on one of said side walls of said filter receptacle between said collar and said lower end of said filter receptacle.

* * * * *